April 5, 1960 R. W. HENNING ET AL 2,931,039
CARTRIDGE FIRING APPARATUS
Filed Aug. 29, 1955 6 Sheets-Sheet 1
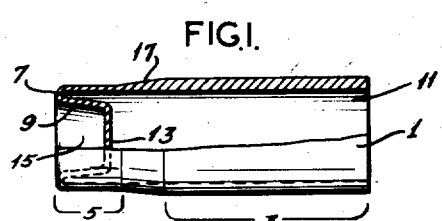
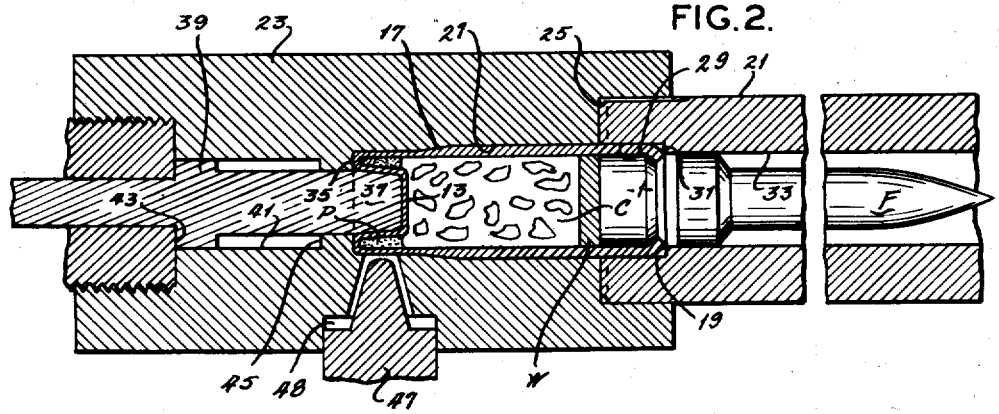
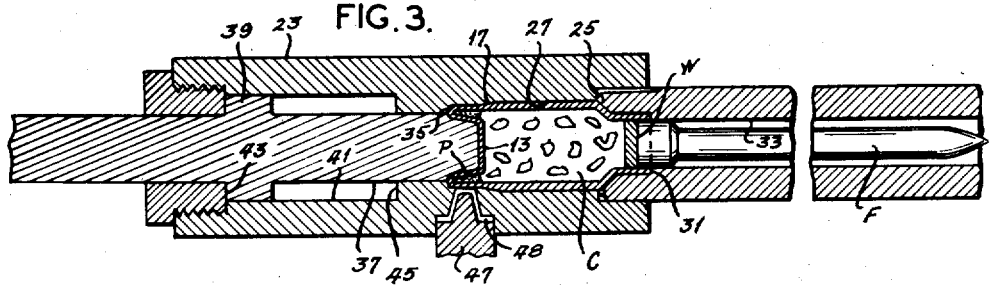
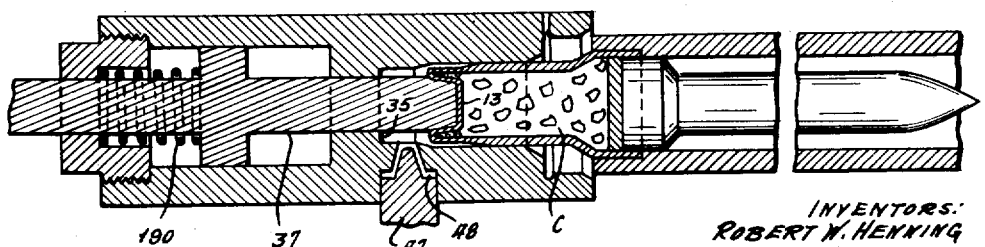
INVENTORS:
ROBERT W. HENNING
ROGER MARSH
By Brueninga and Sutherland,
ATTORNEYS.

April 5, 1960  R. W. HENNING ET AL  2,931,039
CARTRIDGE FIRING APPARATUS
Filed Aug. 29, 1955  6 Sheets-Sheet 2
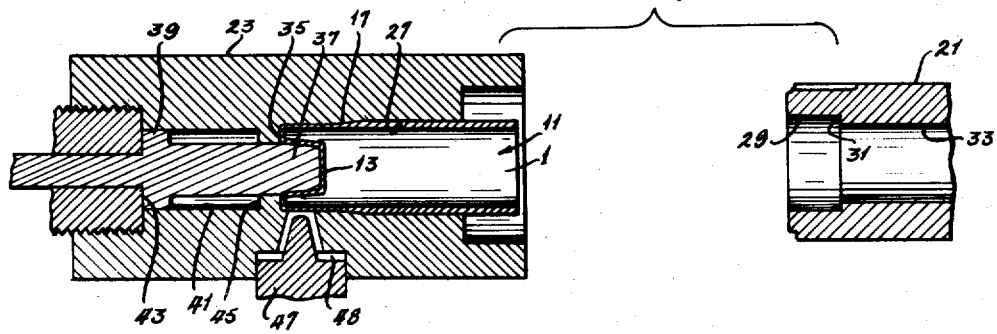
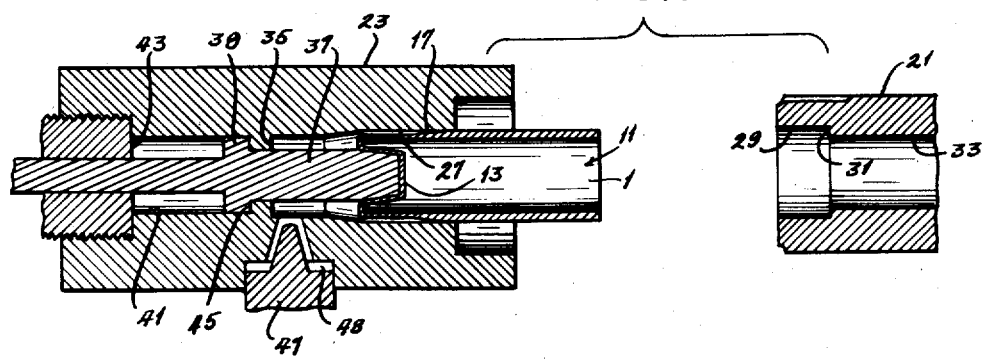
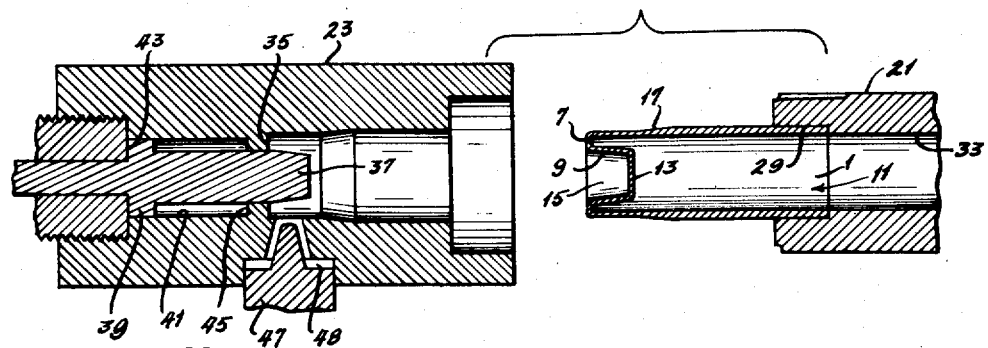
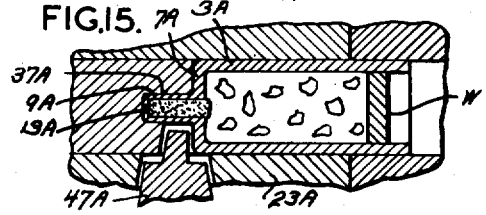
INVENTORS:
ROBERT W. HENNING
ROGER MARSH
ATTORNEYS.

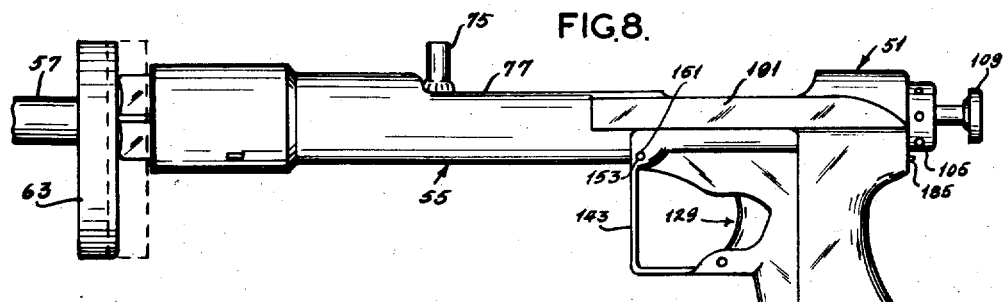
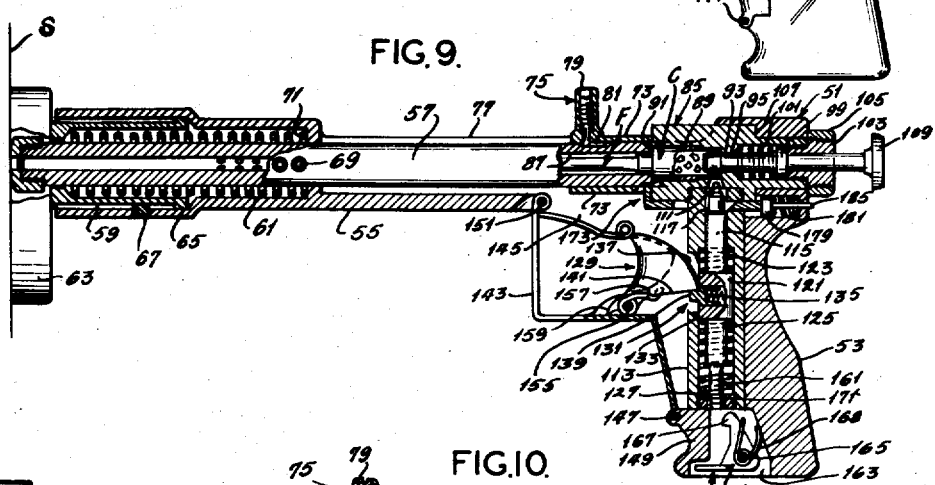
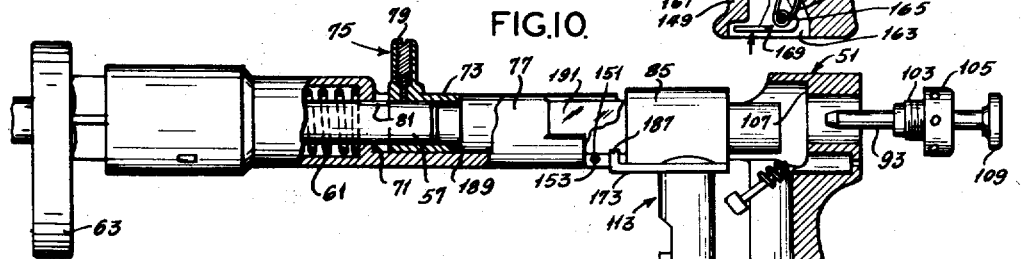
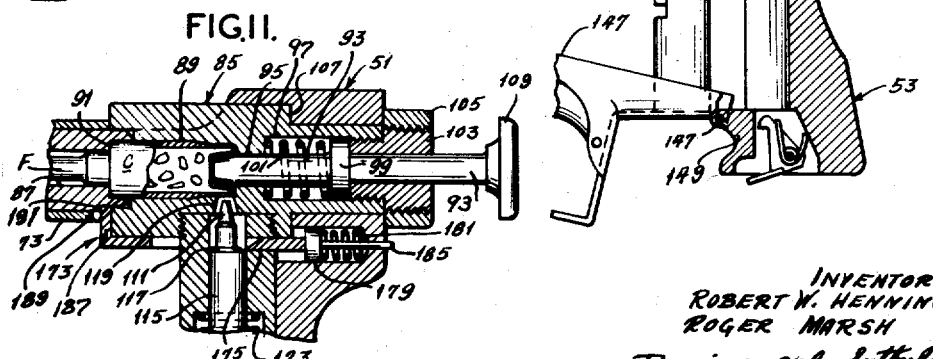

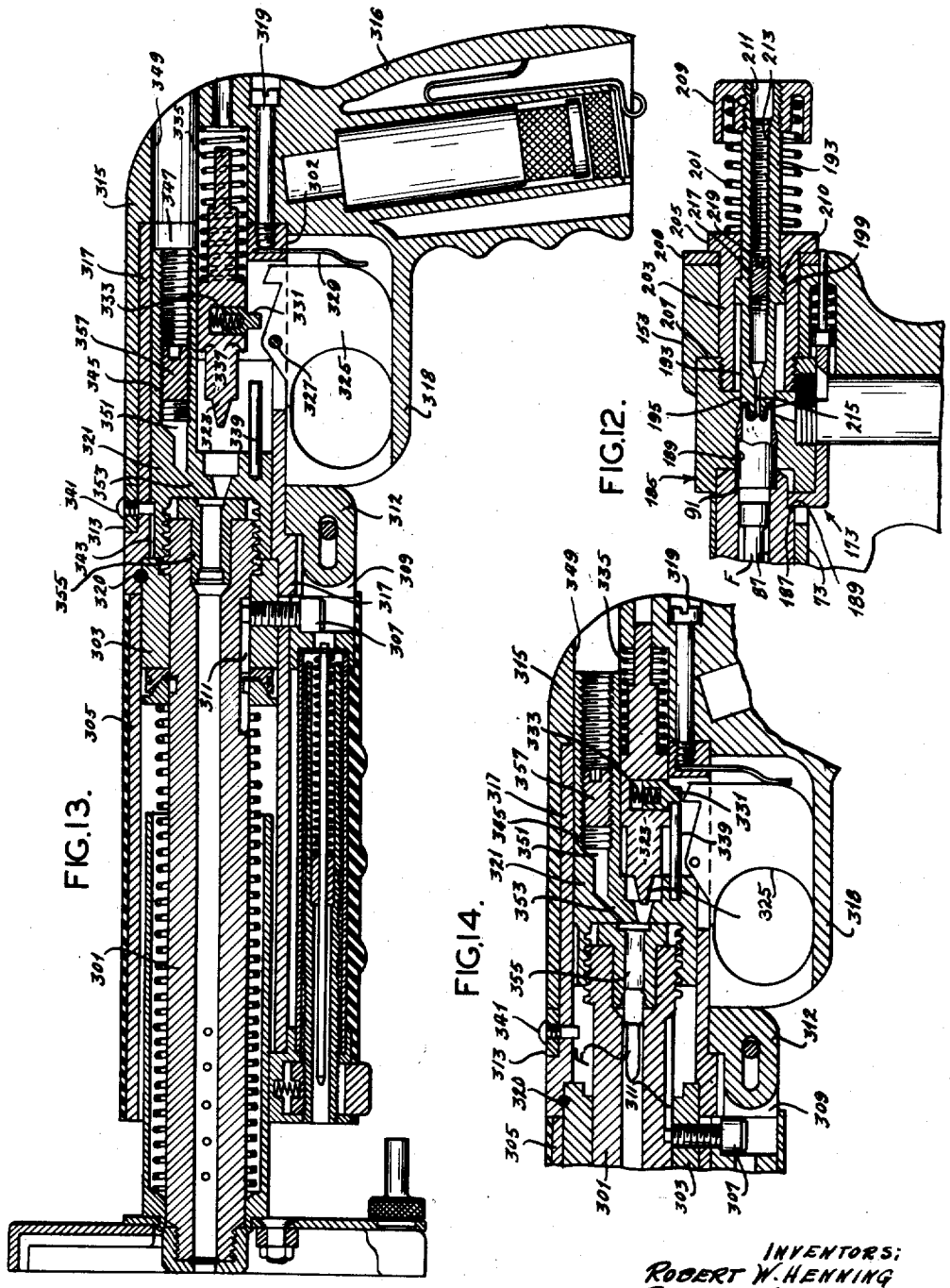

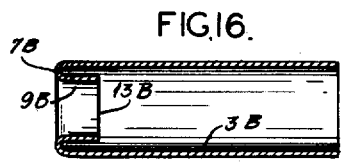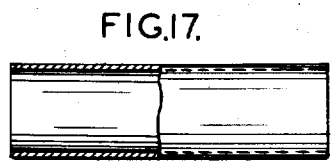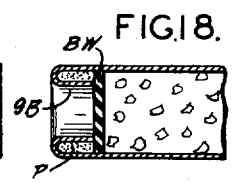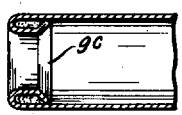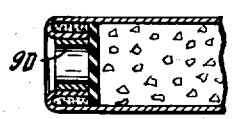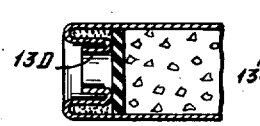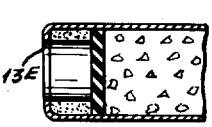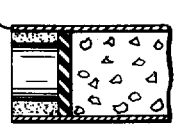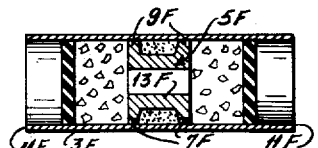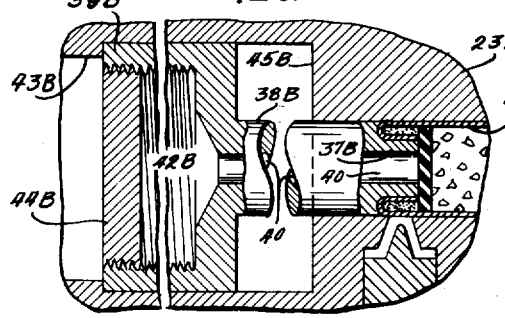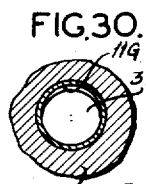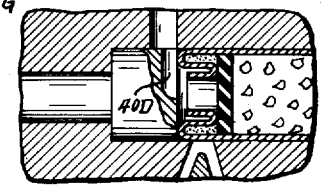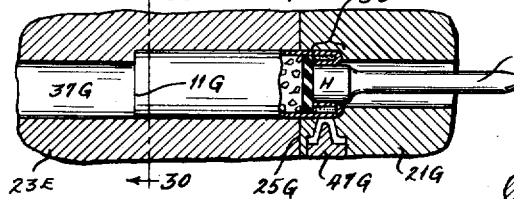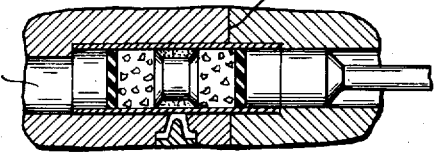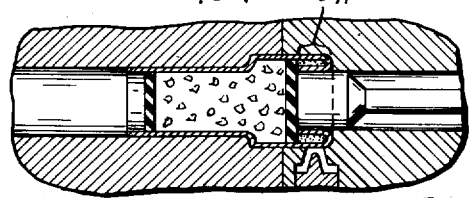

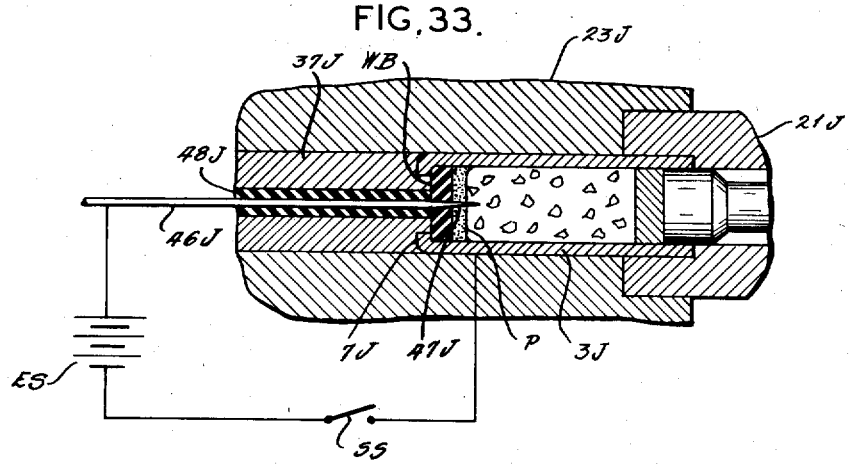

United States Patent Office

2,931,039
Patented Apr. 5, 1960

2,931,039

CARTRIDGE FIRING APPARATUS

Robert W. Henning, Rocky River, and Roger Marsh, Hudson, Ohio, assignors, by mesne assignments, to Olin Mathieson Chemical Corporation, a corporation of Virginia Application August 29, 1955, Serial No. 531,113

17 Claims. (Cl. 1—44.5)

This invention relates broadly to cartridges and cartridge firing apparatus, and has particular utility in powder-actuated tools, although the invention is also applicable to firing arms.

It will be understood that powder-actuated tools utilize a charge of explosive to drive a penetrating fastener, the propellant usually being contained in a conventional rim-fire or center-fire cartridge case. The chamber is formed in the barrel of the device; and in breech loading devices, the cartridge case has the important function of obturating the chamber. That is, the case expands for an instant into sealing engagement with the bore of the chamber, thereby preventing rearward escape of gas through the gap between bolt and barrel.

Rim-fire cases are preferred because of their low cost, but they can be used only for small-bore low-power loadings. The rim must be readily deformable under the blow of the firing pin, and the rim is necessarily located at the face where the bolt head engages the barrel, which is the weakest part of the chamber. Accordingly, excessive loads are likely to result in rupture of the case at the relatively weak, poorly supported head. The weakness is in part overcome by the solid-head center-fire case, the head of which is thicker and stronger (only the primer cup being formed of soft metal), but this type of case is substantially more expensive to manufacture.

One of the objects of the invention, therefore, is to provide a cartridge possessing the low-cost attributes of a rim-fire case and the strength of a center-fire case. In particular, the invention is directed to the provision of a case having a body section containing the propellant and an integrally-joined head section containing the primer. The head section has a circumferential wall that is deformable by a radially-acting firing pin, and the posterior portion of the case (including a substantial length of the body section) is of an outer dimension at any point therealong no larger than at any point anteriorly thereof in the posterior portion of the case. This posterior portion of the case is adapted to seat in and seal with a front loaded part of the chamber in the firing apparatus, the anterior portion being adapted to enter and seal with the barrel. Numerous embodiments are disclosed. The wall of the body section may be thicker than the circumferential outer wall of the head section; the head section may be disposed at either end or intermediate the ends of the case; the posterior end may be open or closed; the primer may be annular; the head section may include an inner circumferential wall integrally-joined to the outer wall to support the annular primer; and this inner circumferential wall may have a reinforcing wall integrally joined thereto.

The invention contemplates that this cartridge will be used with breech-loading apparatus wherein the chamber extends deeply into the bolt or block, the face of the bolt being bored to a depth sufficient to accommodate a substantial length of the body section. Preferably, the relation is one such that a major part of the case telescopes within the bolt, that portion of the body projecting into the barrel being sufficient, however, to obturate the chamber at the instant of firing and prevent escape of high-pressure gas at the breech face. A relatively thick-walled body section will better withstand rupture at this parting line; and since only a small part of the case extends into the barrel, seizure within the barrel is less likely to occur upon opening of the breech. Firing is accomplished by inwardly deforming the outer circumferential wall of the head section.

In conventional cartridge firing apparatus, the firing pin operates in an axial direction, consequently, the blow of the firing pin tends to drive the cartridge forwardly within the chamber, the head of the case perhaps being moved forwardly from the supporting portions of the bolt. This condition wherein the head of the case is unsupported at the instant of firing is especially likely to occur when using rimless cases, but is avoided herein by providing a radially-acting firing pin, which may co-operate with an anvil underlying an annular primer. This anvil may be a discrete member within the case, a reinforced inner circumferential wall, a part of the ejector, or it may be the item to be propelled by the cartridge.

While it is an object of the invention to provide an inexpensive cartridge case that will withstand pressures higher than those permitted by rim-firing cases, the invention also contemplates an improved extraction system for high-pressure applications. For example, powder-actuated tools are frequently operated at pressures substantially higher than those encountered in fire arms, and such high pressures lead to extraction difficulties. Indeed a conventional spring-biased bolt-mounted claw extractor is not especially satisfactory in a powder-actuated tool, and the ramrod method of extraction is necessarily inconvenient.

In accordance with the present invention, the chamber extends deeply into the bolt of the firing apparatus, the relation being one such that only a small portion of the cartridge case projects beyond the bolt into the barrel. With this arrangement, a part of the case is uncovered when the breech is opened, the case usually remaining in the bolt. An ejector is then mounted in the bolt for axial movement, the ejector normally being retracted to form a part of the rear wall of the chamber but being advanced to eject a spent cartridge when desired. In the event that the cartridge sticks within the barrel upon opening of the breech, a substantial portion of the case is uncovered as the bolt is drawn back, and cartridge is then readily removed, as by a blow against the side of the case where it projects from the barrel.

The invention further contemplates an improved system of controlling the force with which a fastener is driven by a powder-actuated tool, such control being desirable because of differences in fasteners and the work materials encountered. An obvious expedient is that of supplying cartridges of different loadings, but this practice lacks convenience. When the loading is fixed, some control over the propelling force may be achieved by varying the "initial free air space" between propellant and projectile. For example, some operators initially place the fastener at a greater distance ahead of the propellant when a reduction in the propelling force is desired, but uniform results are difficult to achieve with this approach. Another technique involves use of venting ports near the muzzle of the barrel to bleed off a portion of the propellent gases at relatively low pressures, but diversion of gases by tapping the barrel is not entirely satisfactory.

In accordance with this invention, briefly stated, the propellent gases are in part bled off but through passages in the bolt or breech block. More particularly, a port is formed in the bolt where it engages the back of the cartridge. The back of the case may be apertured or an opening may be blown through the case when the charge is fired, the gases being in part diverted through this passage. The amount of gas diversion may be controlled by bleeding the gases through a valve or into a chamber of variable volume. With this arrangement, the high pressure gases are confined by strong portions of the mechanism, and the cartridge case may afford protection against erosion at the mouth of the venting port. The cartridge should necessarily have an apertured or rupturable wall, but this aspect of the invention is suited to rim-fire cases as well as to cases of the type disclosed herein.

Other features of the invention will be in part apparent from and in part pointed out in the following detail description taken in connection with the accompanying drawings, in which:

Fig. 1 is a longitudinal section of a cartridge case embodying features of this invention;

Fig. 2 is a longitudinal section of a cartridge and certain cartridge firing apparatus embodying features of the invention;

Fig. 3 is similar to that of Fig. 2 but illustrating an alternative embodiment wherein the mouth of the cartridge is of bottle-neck shape;

Fig. 4 is a view similar to that of Fig. 2 but showing a third embodiment wherein the mouth of the case is flared;

Fig. 5 is a view similar to that of Fig. 2, but with the breech open;

Fig. 6 is a view similar to that of Fig. 5 illustrating the manner in which the cartridge is normally ejected;

Fig. 7 is a view similar to that of Fig. 6 but showing an alternative manner of ejection;

Fig. 8 is a side elevation of a powder-actuated tool embodying features of the invention;

Fig. 9 is a longitudinal section of the tool shown in Fig. 8;

Fig. 10 is a view similar to that of Fig. 9 but showing a changed position of parts;

Fig. 11 is a detail view of certain parts shown in Fig. 9;

Fig. 12 is a detailed view of certain parts of the apparatus shown in Fig. 9, as modified for the purpose of controlling the power of the tool;

Fig. 13 is a longitudinal section of a tool utilizing rim-fire cartridges, but modified as in Fig. 12 to control the power thereof;

Fig. 14 is a detail view of the apparatus shown in Fig. 13, but with the tool ready for firing;

Fig. 15 is a view similar to that of Fig. 1, but showing a different type of cartridge;

Fig. 16 is a view similar to that of Fig. 1 but illustrating an alternative embodiment of the invention, wherein the back of the cartridge is apertured;

Fig. 17 is a similar view showing a preliminary step in manufacturing the cartridge of Fig. 16;

Fig. 18 is a similar view illustrating a second step in the manufacture of the Fig. 16 cartridge;

Fig. 19 is a similar view, but discloses an alternative embodiment wherein the primer is held by a crimp;

Fig. 20 is a view similar to that of Fig. 16 but shows an alternative embodiment wherein the primer is supported on a reinforced part of the cartridge case;

Fig. 21 is a similar view showing an alternative method of reinforcement;

Fig. 22 is a similar view of another means of reinforcing the primer;

Fig. 23 is a similar view of a simplified version of the Fig. 16 cartridge;

Fig. 24 is similar to Fig. 23 but shows a further simplification;

Fig. 25 illustrates a double ended cartridge with a discrete primer-supporting element;

Fig. 26 is a view similar to Fig. 2 but shows an alternative embodiment of the gas bleed off and the cartridge of Fig. 16;

Fig. 27 is a similar view but illustrates another method of diverting the propellent gases;

Fig. 28 is a similar view disclosing another method of gas bleed off;

Fig. 29 is a view similar to that of Fig. 2 but showing cartridge firing apparatus wherein the primer is disposed at the anterior end of the cartridge supported upon the projectile;

Fig. 30 is a section taken on line 30—30 of Fig. 29;

Fig. 31 is a view similar to that of Fig. 29 but showing another type of cartridge;

Fig. 32 is a similar view showing firing apparatus for the cartridge of Fig. 25; and Fig. 33 is a view similar to that of Fig. 2 but of an electrically fired cartridge embodying the invention.

When a cartridge is fired, extremely high pressures are developed, these pressures being sufficient to expand the body of the case into sealing engagement with the wall of the firing chamber in the barrel. For an instant, the case is frozen to the barrel, but the case normally contracts sufficiently to permit easy extraction as the breech pressure drops upon movement of the projectile along and from the barrel. If the cartridge case is too weak for the pressures developed, however, the body does not contract properly and extraction becomes difficult. Rim-fire cartridges formed of soft copper may tear, and automatic operation is hindered because of the relatively large area of contact between barrel and case.

Moreover, those portions of the case that are weakly supported, especially in the region of the parting line between bolt and barrel, are susceptible to rupture under excessive breech pressures. For example, the head of a rimmed case cannot be fully supported because it lies at this parting line, and the head of a rim-fire case must be soft in order to permit deformation by a firing pin. Although the solid-head center-fire case is much stronger, blown primers and extraction difficulties are encountered when the breech pressures are high. Also, the center-fire case is more expensive to manufacture. For these reasons, the cartridge case has been a limiting factor in the design of high-powered apparatus, especially powder-actuated tools.

Referring now to Figs. 1 and 2 of the drawings, there is shown an improved cartridge 1, which is suitable for high-power loadings yet which can be manufactured at a cost comparable to that of a rim-fire cartridge. The case is formed, as by a series of drawing operations, with an elongate cylindric body section 3 and a head section 5 integrally joined at the posterior end of the body section. The outer circumferential wall of this head 5 may be thinner than that of the body and is an outer dimension no greater than that of the body. Preferably, the inner wall diameters of parts 3 and 5 are the same. This head section 5, in turn, is integral about an open fold 7 with an annular reentrant shoulder or inner circumferential wall 9 of diameter somewhat less than that of the outer wall. The head 5, fold 7 and shoulder 9 thus define an annular channel, which opens forwardly to the body section 3. The primer mixture P is contained within this channel and a charge C of propellant is contained forwardly of the primer in the body, the charge being confined behind a wad W, preferably of plastic combustible material. The mouth 11 of the case at the anterior end is open, but the posterior end is closed by a web 13 extending integrally from the inner end of the shoulder-forming wall 9, so as to form a rearwardly opening cavity 15.

For example, a cartridge suitable for fasteners of one-quarter inch diameter might be made with an inside diameter throughout the outer wall of body 3 and head 5 of .250 inch, the outer diameter of the body wall being .300 inch and the outer surface of the head wall 5 tapering at 17 to a diameter of .276 inch. The wall thickness of the head 5 accordingly would be .012 inch, whereas the wall of the body 3 would be .025 inch thick. The shoulder-forming wall 9 preferably tapers slightly in the forward direction and is spaced from the wall 5 a distance such that the channel width is .020 inch at its base. The depth of cavity 15 might be .125 inch where the length of the thin-walled head 5 is .187 inch, and the overall length of the case may be from thirteen-sixteenths to one inch. Walls 7, 9 and 13 would not normally be held to precise thicknesses, but should be at least as thick as the head-forming wall 5.

A case satisfactory for fasteners of larger diameter may be made by increasing the inner diameter of the body, head and shoulder. In addition, a bottleneck case with a reduced mouth may be made, as shown in Fig 3; or the mouth of the case may be flared, as illustrated in Fig. 4. Although cartridge brass is preferred, the design is such that steel or other materials may be used. It will also be apparent that the drawing operations are not difficult. For example, a disc would be drawn using the same techniques as those employed in drawing conventional rim-fire cases. Instead of bumping on a rim, however, the cup is subjected to a drawing operation that thins the head 5 and deforms the base 13 inwardly to provide the reentrant shoulder 9. In order to facilitate insertion of the case within a barrel, the mouth might also be crimped, as shown at 19 in Fig. 2, the crimp being ironed out by the forces developed upon firing.

Referring now to Fig. 2 of the drawings, the firing apparatus for this cartridge is shown to comprise the usual barrel 21 and a bolt or breach block 23, which closes against the barrel at a breech face 25. The face of the bolt 23 is bored out at 27 to form a relatively deep chamber, but the depth of the bore is less than the length of the cartridge, although it is sufficient to accommodate all of the thin-walled head portion 5 of the cartridge. Preferably, the section 27 of the chamber is of a length such that the cartridge case is primarily contained by the bolt and only a relatively short mouth portion projects beyond the breech face 25 into the barrel. That portion of the cartridge case projecting into the barrel should be sufficient, however, to seal the barrel when the cartridge expands at the instant of firing. This forward barrel portion 29 of the chamber may be in the form of a counterbore having a shoulder 31 which normally engages with the mouth end 11 of the cartridge case. The main bore 33 of the barrel is then of a diameter corresponding approximately to the inside diameter of the cartridge case.

When a bottle-neck case is employed, as shown in Fig. 3, the parting line should occur at or rearwardly of the shoulder on the case; and in that event, there would be no necessity for a shoulder such as shown at 31 in Fig. 2. If the cartridge is of a flaring bell design, the parting line between bolt and barrel would be at or forwardly of the shoulder on the cartridge case (Fig. 4).

At its other end, the fold 7 of the case is supported upon a part 35 of the bolt, which defines the base of the bore 27. The reentrant shoulder 9 and the web 13 of the case, in turn, are supported upon a forwardly projecting anvil 37, which anvil may be mounted for axial movement to function as an ejector. For example, the anvil 37 might be the nose of a rod having a collar 39, which slides within a cylindric recess 41 formed at the rear of the bolt. When the post is fully retracted to accommodate the cartridge, the collar 39 abuts against a part 43 of the mechanism, forward movement of the post upon ejection being limited by a shoulder 45 formed within the bolt. The nose of the post, which is received within the cavity 15 of the cartridge case, also functions as an anvil for a radially-moving firing pin 47, which pin is mounted opposite the thin-walled head section 5 of the cartridge in a recess 48. The firing pin 47 is shown in its normally retracted position, but may be advanced to crush the thin-walled head and ignite the primer.

It will be understood that the breech may be unlocked or the bolt may be locked against the barrel, as by locking lugs, but in either event, the apparatus should provide for a limited amount of straight axial movement of the bolt relative to the barrel, when the breech is opened. In other words, the bolt should move rearwardly or the barrel should move forwardly an amount sufficient to clear the cartridge case from the barrel, before the bolt is swung laterally, as illustrated in Fig. 5. The amount of this axial movement should also be sufficient to clear the cartridge case in the event that it should stick within the barrel.

In loading, the cartridge 1 and fastener F may be separate, as in Fig. 2, or a unitized assembly where the base of the fastener is seated within the mouth of the cartridge case, as in Fig. 3. After opening the breech, a cartridge and fastener are inserted within the barrel. As the breech is closed, the head of the cartridge telescopes within the bolt, the mouth of the case engaging the shoulder 31 within the barrel, so that the case is properly seated in the chamber with the portions 7 and 13 thereof supported, respectively, against the parts 35 and 37 of the bolt. The firing pin is then driven inwardly to fire the cartridge.

As the cartridge expands under the internal gas pressures, the forward mouth portion is expanded within the forward portion 29 of the chamber to seal the barrel, so that gas cannot escape rearwardly through the breech face 25. The thick-walled body 3 of the cartridge case overlies the breech face or parting line 25 and resists failure at this point, whereas the relatively thin-walled head 5 is readily deformable by the firing pin. Gas escape holes may be drilled into the recesses 41 and 48 to exhaust gas escaping thereto in event of failure of the case at a point within the bolt.

In opening the breech, the bolt 23 is initially moved straight back from the barrel; and in normal operation, the cartridge case would remain within the bolt since the area of contact with the bolt is substantially greater than that with the barrel. As illustrated in Fig. 5, the cartridge is extracted from the barrel automatically upon opening of the bolt. The cartridge is then ejected by advancing the axially movable post 37, as illustrated in Fig. 6. Should the web 13 of the case be punched from the body, ejection can be conveniently had by gripping the forwardly projecting mouth of the cartridge case to pull it from the bolt. If desired, however, the post 37 might be of a larger diameter so as to support the fold 7 of the cartridge as well as the portions 9 and 13.

This arrangement is to be contrasted with conventional firing apparatus wherein the entire body of a cartridge is received within the barrel and only a nominal head portion is recessed within the bolt. One of the advantages to be noted with this arrangement is that the area of engagement with the barrel is substantially less than that with the bolt, thus minimizing difficulties that might otherwise be encountered in extracting the case from the barrel. Such extraction difficulties are encountered when the charge is unusually heavy or in automatic apparatus. In the case of conventional automatic weapons, the breech may attempt to open while the wall of the cartridge is still frozen against the barrel chamber. When using apparatus of the type described herein, seizure within the barrel is less likely to occur since only a small part of the cartridge extends within the barrel.

In the event that the cartridge herein should freeze within the barrel, as in Fig. 7, ejection is still possible, inasmuch as a substantial portion of the case will be uncovered by rearward movement of the bolt; and in the normal instance, the cartridge may be knocked loose by a blow delivered radially against this rearwardly projecting portion of the cartridge.

Referring now to Figs. 8–10 of the drawings, there is shown a complete powder-actuated tool for driving fasteners utilizing a cartridge of the type described heretofore. The tool is formed with a receiver 51 having an integral grip 53 and a forwardly projecting housing 55 for a barrel 57. The forward portion of the barrel housing 55 is somewhat larger than the outer dimension of the barrel so as to accommodate an axially-movable sleeve 59, which is biased forwardly by a spring 61. A cup-like muzzle shield 63 is secured at the end of this sleeve so as to be biased away from the barrel housing, as shown in Fig. 8. Outward movement of the sleeve is limited, however, by a rear flange 65, which engages a retaining key 67 in the barrel housing, the retaining key being removable to permit disassembly. It will be understood that the shield 63 is pressed against a work surface S (Fig. 9) in order to protect the operator and bystanders against muzzle blast and spalling of the work surface, when the tool is fired.

The barrel 57 may also have venting ports 69 adjacent the muzzle, which ports open into the space defined forwardly of shoulder 71. These ports permit escape of gas from the barrel in the event that the head of fastener F is not driven entirely from the barrel.

The barrel is mounted within its housing 55 for axial movement, the muzzle thereof being adapted to telescope through the sleeve 59 and attached muzzle shield. A bearing surface for the barrel is formed by the shoulder 71, and a collar 73 is secured over the rear end of the barrel to slide within a space formed rearwardly of this shoulder and forwardly of the grip. A barrel-actuating handle 75 is provided to facilitate such movement of the barrel, the top of the housing being cut away at 77 to accommodate the handle. The handle preferably has a lost-motion connection with the barrel, for reasons to be explained. In the illustrated embodiment, the handle is in the form of a stud projecting from the collar 73 and contains a screw 79. The tip of the screw, in turn, is engaged within an elongate groove 81 cut in the barrel, the groove permitting limited movement of the collar 73 relative to the barrel.

When the barrel is fully retracted, as shown in Fig. 9, the breech face or rear end thereof abuts against a breech block 85, the collar 73 then being moved to its advanced position on the barrel by engagement with the breech block. Full retraction of the barrel is achieved only when the muzzle is pressed against the work surface, so as to lie flush with the face of the muzzle shield, thereby assuring that the muzzle is safely enclosed at the instant of firing. The lost-motion connection between the handle 75 and the barrel 57 prevents the handle from being used to close the breech its full amount, inasmuch as the groove 81 allows the barrel to slide forward a slight distance within the collar 73. The handle 75 is used to open the breech wide for purposes of loading the tool and extracting a spent cartridge. The slot 77 in the housing is relatively long and the forward movement of the barrel correspondingly large in order to permit elongate fasteners F to be loaded, the fasteners normally being received within the bore 87 of the barrel.

As shown in Figs. 9 and 11, the firing chamber for the cartridge C is formed in part by a forwardly-opening bore 89 in the breech block 85 and in part by a counterbore 91 in the breech of the barrel. In length, the chamber should correspond to the cartridge used, but that portion of the cartridge projecting within the barrel should be somewhat less than that contained by the breech block, as explained previously. Although the head of the cartridge may be in part seated against the breech block, the head cavity is supported upon the nose of a push-rod 93. This rod projects rearwardly from the breech block through a hole 95 and a rearwardly-opening counterbore 97. Axial movement of the rod is limited by an annular flange 99 confined within the counterbore 97 and biased rearwardly by a spring 101 against a cap 103. The cap 103 is screwed into the breech block; and a lock nut 105 is threaded over the cap into engagement with the receiver. The breech block 85 is thus secured within the receiver against a shoulder 107, the rear portion of the block being of reduced diameter. A knob 109 may be attached to the end of the push-rod.

The firing-pin 111 and operating mechanism therefor are contained as a unit within a cylindric housing 113, which is threaded into the bottom of the block 85 so as to extend through the grip of the tool. An elongate plunger 115 is received within the cylinder 113 for axial movement toward and away from the cartridge, and the firing pin 111 projects from the upper end 117 of this plunger. A tapering hole 119 in the breech block admits the tip of the firing pin for contact with the head of the cartridge, but the pin is normally held back within the hole 119 clear of the cartridge.

The lower section of the cylinder 113 is counterbored to accommodate an enlarged shoulder-forming section 121 formed on the plunger intermediate its ends. A spring 123 seated against the upper end of this shoulder normally biases the firing pin to a neutral position clear of the cartridge, whereas a second spring 125 is seated against the lower end of this shoulder. A plug 127 is screwed within the bottom of the cylinder 113, and the enclosure thereby defined is of a length such that the spring 125 is unloaded or very lightly loaded.

In order to fire the cartridge, the plunger 115 is drawn back to load the spring 125 and is then released, this being accomplished by means of a trigger 129 and a cooperating pawl 131. The pawl is carried by and projects forwardly from the plunger through an opening in the cylindric housing 113, the lower edge 133 of which opening is formed as a rearwardly declining ramp for the pawl. A spring 135 biases the pawl forwardly so that a shoulder thereof normally engages the back 137 of the trigger, while the tip 139 of the pawl extends beneath a lower edge 141 of the trigger.

The trigger 127 is mounted within a hollow housing having a guard 143 and sides 145, which sides overlap the unit 113. The trigger housing is secured by a pivot pin 147 at its lower end to the base 149 of the grip, which projects forwardly beneath the unit 113. The upper end of the trigger housing is then locked by a removable pin 151 extending through a hole 153 in the barrel housing. The trigger, in turn, is pivoted on a pin 155 located near the base of the finger opening so that the lower edge 141 of the trigger is moved downwardly when the front of the trigger is pulled back, a spring 157 being provided to bias the trigger in the opposite direction.

When the trigger is pulled, the plunger is depressed to load the spring 125; and when the tip 139 of the pawl engages the lift-off ramp 133, the pawl is moved inwardly clear of the trigger, whereupon the plunger is free to move upwardly under the bias of spring 125. In this upward movement, the tip 139 of the pawl rides over the back 137 of the trigger, the trigger being shaped to clear the housing 113. When the trigger is then released, the spring 157 biases it upwardly over the pawl to a position against a limit stop 159, wherein the lower edge 141 again overlies the tip 139 of the pawl.

The firing pin mechanism cannot be operated, however, unless certain safety devices have been actuated. It will be noted that a stem 161 depends from the plunger 115 into a hole in the plug 127 and that the base 149 of the grip is cut out at 163 to accommodate a hook 167 mounted on a pivot pin 165. This hook is normally spring biased at 168 to a position beneath the stem 161, thereby preventing retraction of the plunger; but the hook is moved clear of the stem 161 by inward movement of an associated lever 169, whereupon the stem may descend into the recess 163. Moreover, the stem is formed with grooves 171 which are cooperable with the hook 167 to prevent release of the firing pin unless the lever 169 is held depressed. The location and manipulation of this safety device is such as to require the use of one hand to operate it while the other hand is engaged in actuating the trigger; hence this may be termed a "two-hand" safety or fire lock.

An additional safety device is provided at the upper end of the housing 113 to prevent firing of the cartridge except when the barrel is against the breech block. This device is in the form of an interlock plate 173, which is slidably held against the lower face of the breech block 85. The cylindric housing 113 extends through the interlock plate and is formed with a slot 175, within which the rear portion of the interlock plate is slidably confined. This rear portion 177 of the plate normally overlies the upper end 117 of the plunger, thereby preventing the firing pin 111 from being driven into contact with the cartridge. For example, the interlock plate may be biased forwardly by a plunger 179 and cooperating spring 181 contained within the receiver 51, the plunger having an indicator rod 185 extending through the back of the receiver.

Otherwise, the interlock plate extends forwardly and is turned up as a finger 187 across the breech face of the block for cooperation with the barrel. The collar 73 is cut away at 189 to accommodate the finger 187, the notch 189 being of a depth such that the interlock cannot be operated merely by drawing back the collar against the face of the block 85. On the other hand, the breech of the barrel may engage the finger at 191 to hold the interlock rearwardly clear of the plunger 113, when the housing is fully depressed with respect to the barrel until the latter is against the breech block.

An alternative possibility would be that of applying a slight forward bias 190 on the push-rod 37, as illustrated in Fig. 4, so that the cartridge is normally held forward of the firing pin. When the muzzle of the barrel is pressed against the work, the barrel holds the cartridge back as the breech block is moved forwardly against the bias of spring 190 to receive and thus prepare the cartridge for firing.

In operation, the handle 75 is advanced to open the breech; a fastener F is inserted within the barrel 57; and a cartridge C is loaded within the breech block 85. The barrel necessarily projects substantially beyond the muzzle shield 63, and the muzzle shield is initially in its advanced position of Fig. 8. Preparatory to driving the fastener, the tool is pressed against the work surface S at the muzzle shield 63 as the grip 53 is grasped and receiver 51 and barrel housing 55 are pushed forward against the bias of spring 61 until the barrel 57 contacts plate 173 which on further housing movement is held back against the bias of the interlock spring 181. The plunger 115 is thus moved clear of the interlock plate 173 so that the barrel collar 73 carried with the barrel is against the breech block.

The "two-hand" safety is then actuated at 169 and the trigger pulled, thereby retracting the plunger 115 and associated firing pin 111 to load the spring 125. Ultimately, the actuating pawl 131 engages the lift-off ramp and is moved back clear of the trigger, whereupon the firing pin is then driven home against the cartridge. It will be noted, that the muzzle must be held against the work surface S and the safety element 169 must be fully depressed at the instant of firing.

In unloading the tool, the handle 75 is advanced to open the breech, and in most instances, the cartridge will remain in the breech block 85. The cartridge is thus automatically extracted from the barrel and it is then ejected from the breech block by inward actuation of the push-rod 93. Should the cartridge accompany the barrel forward, it may be flipped out with the finger or a point of a fastener.

It will also be observed that the tool is easily disassembled for cleaning, repairs and the like. When the locking pin 151 is withdrawn from the trigger housing, the latter may be hinged downwardly on the pivotal connection at 147, as shown in Fig. 10. The push-rod assembly (including elements 93, 103 and 105) is readily unscrewed from the breech block 85. The breech block is then free to telescope forwardly from the receiver. That portion of the receiver between the grip 53 and the barrel housing 55 is open at the top and bottom, although supported at the sides by reinforcing ribs 191, so as to permit the breech block 85 and attached firing pin housing 113 to move forwardly and be withdrawn upwardly. The barrel is removed by loosening the screw 79 at the collar 73, the barrel then being free to telescope forwardly from its housing.

Referring now to Fig. 12, there is shown a modification for controlling the force with which the fastener is driven. Although there have been various proposals for reducing the propelling force of the propellant, they lack convenience, lead to non-uniform results, or involve tapping the barrel. It is contemplated herein that a bleed-off system will be employed, but that the chamber will be tapped, preferably at the back of the cartridge, and that the cartridge case is ruptured under controlled conditions.

The tool may be identical to that described previously, except the breech block and associated parts are altered to include a venting passage opening into the base of the chamber. The breech block 185 has a forwardly-opening chamber 189 and a hole 195, through which a push-rod element 193 extends. This element 193 is of somewhat larger diameter than the rod 93 previously illustrated, hence the head fold of the cartridge as well the head cavity are supported upon the nose of this element. Also, the breech block is shorter, a sleeve 203 being threaded into the block to extend through the receiver 153 from the shoulder 207. This sleeve has a flange 205, which locks the block within the receiver, the flange being in engagement with a Belleville spring 206 against the back of the receiver. The element 193 projects rearwardly from the sleeve, and a spring 201 about the element is compressed between the receiver and a knob 209 threaded onto the end of this rod element 193. As such, the element 193 is normally in its retracted position, so that a cartridge may be loaded into the chamber 189.

Rearward movement of the element is limited by engagement of an integral annular flange 199, which telescopes within the sleeve from a forward position against the block 185 to a rear retracted position against a shoulder 210 formed on the sleeve 203. The knob 209 has a central opening 211 communicating with an elongate threaded passageway 213 extending longitudinally through the element 193. The forward end 215 of this passageway tapers to a relatively small gas bleed-off port extending centrally through the nose of the element 193 to the head of the cartridge. The passageway is otherwise closed by a threaded plug 217 adjustable longitudinally within the passage 213. The plug may have a socket recess 219 for cooperation with an elongate Allen wrench or other suitable device which would be entered through the opening 211 in the knob. When the plug 217 is adjusted to a forward position within the push-rod element, the bleed-off chamber is of a relatively small volume and the cartridge develops its maximum power for a given loading. As the plug is adjusted rearwardly, the volume of the bleed-off chamber is increased, and the power of the cartridge is accordingly reduced.

It should be understood, however, that the invention contemplates other arrangements for disposing of the gases bled-off from the cartridge case. For example, the passageway 213 might be in the form of a valve for venting the gases to atmosphere. With this arrangement, the cartridge case affords protection to the mouth of the port 215, thereby minimizing erosion at this point. Indeed, portions of the case may be folded inwardly slightly around the mouth of the bleed-off port. Also, the location of the bleed-off port in the relatively strong breech block minimizes the possibility of damage to the more delicate parts of the mechanism. Perhaps, this can best be explained by noting that the strength of the receivers of modern firearms is more than adequate to handle loadings customarily used. The limiting factor on loading has been the cartridge case, and when the case ruptures under excessive loading, the relatively small extractor or other weak parts were likely to be damaged.

Referring now to Figs. 13 and 14, it will be apparent that the invention is also applicable to other types of cartridges, such as the conventional rim-fire cartridge, at least as to the feature of bleeding off a portion of the gas through a rupturable section of the cartridge case. Figs. 13 and 14 illustrate a powder-actuated tool of the general character disclosed in the copending application entitled Explosively Actuated Tools, in which we are joint inventors with Rowland J. Kopf, Serial No. 355,034, filed May 14, 1953. The tool is the same as that described in the prior application with the exception noted below.

The tool includes a forward barrel assembly comprising a barrel 301, a rear collar 303, and a tube 305. A screw 307 secures the tube in telescoping relationship with the barrel between a hinge bracket 309 and the collar 303. The tip of screw 307 also enters a keyway 311, thereby preventing rotation of the barrel within its housing while permitting axial movement.

The breech assembly is rotatably held in a ring 313, which is secured at 312 upon the hinge bracket 309 in a way permitting limited axial movement. This breech assembly is formed by a receiver 315 having an integral grip 316 and trigger guard 318. A removable firing unit is contained within a firing mechanism housing 317, which itself is secured within the receiver by a screw 319. The housing 317 may be locked at 320 to the barrel housing assembly and contains a breech block 321 and a firing pin 323, both of which are movable axially. The firing pin is normally biased forwardly by a spring 335 against shoulders 337, but can be moved rearwardly. The trigger 325 is pivoted to this housing at 327 and is biased clockwise by spring 329, but is cooperable with a radially movable pawl 331 carried by the firing pin 323 and spring biased outwardly by spring 333.

The breech block 321 is also adapted for axial movement and carries a cocking pin 339, which projects rearwardly so as to engage the pawl 331 upon retraction of the breech block. A pin 341 extends through the upper portion of the ring 313 for partial locking cooperation with the breech block. The tip of pin 341 projects into a keyway having a longitudinal portion 343 comunicating with a circumferential portion (not shown). Also, the breech block is recessed to accommodate the rear portion of the barrel, and there are segmented locking threads to lock the breech when the block 321 is rotated over a limited arc, such rotation being permitted by the ring 313. The block, in turn, is held against rotary movement relative to the breech assembly by an integral tube 345 projecting rearwardly through an opening 347 in the trigger mechanism housing 317. A similar opening 349 in the receiver 315 permits rearward movement of the breech block.

The arrangement of the groove 343 and pin 341 is such as to lock the breech block within the housing 317 when the grip 316 is rotated to a position for disengaging the lugs on the barrel. In other words, the breech block 321 is held against axial movement by engagement of the pin 341 within the circumferential portion of the groove shown at 343 when the breech is opened. When the breech is closed and the locking lugs are engaged, the pin 341 becomes aligned with the longitudinal portion of groove 343 so that the housing may be moved forwardly relative to the locked assembly of barrel and breech block. Such forward movement occurs when the muzzle of the barrel is pressed against a work surface.

As shown in Fig. 14, this condition results in rearward movement of the cocking pin 339, which in turn, forces the firing pin back against the bias of its spring 335. When the trigger 325 is then depressed, the pawl 331 is forced upwardly clear of the cocking pin, whereupon the firing pin is driven forward by its spring to fire the cartridge. In the prior patent application, the breech block was biased forwardly by a spring located above the firing pin, but in the present instance, this space is taken up by the tube 345. Also, it will be noted that the screw 319 has been repositioned. An additional distinction (the most significant for the purposes herein) is that the tube 345 is formed with a chamber 351 having a port 353 opening against the head of the rim-fire cartridge case 355. This chamber 351 is otherwise closed by a threaded plug 357, which may be screwed forwardly or rearwardly to vary the volume of chamber 351 and thereby the power with which a fastener is driven. Otherwise, the tool shown in Fig. 13 is described in detail in the aforementioned patent application.

Although several embodiments have been disclosed in detail, it should be understood that the invention encompasses many variations and modifications. For example, Fig. 15 illustrates a rimless case formed with a thick body section 3A and a back web or fold 7A, which define a front chamber for the propellant. The primer is contained in an integral cup-like head section of smaller diameter, which is formed with relatively thin walls 9A and 13A projecting rearwardly from the fold 7A. The primer pocket should be centered with respect to the body, so as readily to enter recess 37A in the firing mechanism, and the principles of operation are the same as those previously described, there being a transversely movable firing pin 47A set back so that a substantial portion of the body section is received within the bolt 23A.

Figs. 16–18 illustrate a cartridge somewhat like that shown in Fig. 1, but the back of the case is open. The case is formed with a cylindric body 3B, an annular rear fold 7B, and an annular reentrant shoulder or inner wall 9B, but the back of the case is left open at the inner edge 13B. Such a cartridge case might be formed from cylindric tubing, such as illustrated in Fig. 17; and the first stage in the manufacturing process would be that of forming the fold 7B and shoulder 9B. The primer P is inserted, preferably as a previously molded ring or as a paste that dries in place (Fig. 18), and a base wad BW is pressed against the inner edge 13B. In such event, the base wad serves to hold the primer in position, but a portion of the shoulder might be crimped over as indicated at 9C in Fig. 19. The base wad of such cartridge should necessarily provide for passage of the ignition flame into the body section containing the primer, and in most instances, the base wad will be formed of a material which is entirely consumed in firing the cartridge.

In firing the cartridge of Fig. 16 with a transversely-movable firing pin, it will generally be necessary to support the inner wall 9B upon an anvil, as shown in previous embodiments. On the other hand, the anvil support is not essential if the inner wall of the head section is strengthened against collapse. Such reinforcement may be in the form of a supplementary collar as shown at 9D in Fig. 20, or it may be the apertured radial flange 11D shown in Fig. 21, or a reverse annular fold 13D may be formed, as indicated in Fig. 22.

In most of the previous embodiments, the head section is formed by integrally-joined inner and outer walls, but the inner wall might be eliminated, as indicated at 13E in Fig. 23. Even the end fold could be dispensed with, as appears at 7E in Fig. 24. These modifications will require the use of a self-supporting or adhesively secured ring of primer composition, but such materials are known to those skilled in the art. Necessarily, an anvil is used in firing the cartridges of Figs. 23 and 24.

Fig. 25 illustrates a variant wherein the primer is disposed intermediate the ends 11F of a cylindric tube-like body 3F and is supported by a discrete anvil 5F provided within the case. This element is in the form of a spool, the center portion 13F of which may be open. The outer periphery of the spool is formed with an annular channel defined between flanges 9F, which may in part open at the sides through notches 7F. The spool should be of sufficient strength to permit crushing of the primer by indentation of the outer wall, that portion opposite the spool being the head section, which in this instance could be of reduced wall thickness relative to the other portions of the case.

In each instance, the cartridge is adapted to obturate the parting line at the breech face of breech-loading apparatus. Any appropriate deformable material might be employed in making the above-described cartridge case and while cartridge brass is the most obvious material, other possibilities include other metals, cardboard, and synthetic plastic materials.

Whereas there are numerous disclosed variations of the cartridge case, the invention contemplates variations in the firing mechanism, and particularly in the manner of supporting the primer, the way in which propellent gases are bled through the breech block, and the method of ejecting a cartridge.

Referring now to Fig. 26, there is shown firing apparatus such as might be employed with the cartridge of Fig. 16. The apparatus, in general, is similar to that shown in Fig. 2, in that there is a barrel and a cooperating bolt or breech block 23B, which engage with one another at breech face. The bolt 23B is formed with an axial bore 27B extending rearwardly to accommodate a substantial portion of the cartridge, and the back of the cartridge is supported upon a telescoping ejector 38B. The forward portion 37B of element 38B is of reduced diameter so as to form an anvil 37B for the head section at 9B of the cartridge, whereas the opposite end 39B of the ejector is of substantially larger cross section and abuts against a rear stop 43B, when the cartridge is in firing position. The ejector may be moved forwardly against a stop 45B, however, to eject the cartridge.

It will also be noted that a passageway 40 extends axially through the ejector 38B from the anvil-forming portion 37B to an enlarged chamber 42B. This chamber may be threaded, and an adjustable plug 44B is provided to vary the volume of the chamber and thereby the power of the cartridge. Otherwise, the apparatus is similar to that described heretofore.

Figs. 27 and 28 illustrate modifications wherein the propellent gases are bled off through the bolt or breech block 23C. In Fig. 27 the anvil 37C and part 39C of the ejector have a right angular passageway 40C, which communicates with a radial passage 42C in the bolt when the cartridge is in firing position. It will be understood that the ejector is axially movable but may be restrained against rotary movement, so that the passages 40C and 42C register when the anvil is retracted.

The apparatus shown in Fig. 28 is similar to that illustrated in Fig. 27, but in this instance, the anvil is eliminated and one or more radially-extending grooves 40D perform the function of the passageway 40C described above. In using this type of apparatus, it is preferable to employ a cartridge of the type illustrated in Figs. 20–22, wherein the inner wall of the head section is reinforced. It will also be understood that the requirement for registry of the passages with the fixed passages may be overcome by providing an annular channel in the bolt or ejector.

In each of the above-described firing devices, the primer is rearwardly disposed and the propellant is located forwardly of the primer. This relationship may be reversed, however. Front ignition offers advantages in that there is less tendency for powder grains to be blown into the barrel when partially burned.

Referring to Fig. 29, the primer or head section 5G is shown to be disposed at the front of the cartridge and is supported against collapse by the head H of a fastener F. In this case, the firing pin 47G is mounted for transverse movement within the barrel 21G, and the parting line or breech face 25G of breech block 23E is disposed rearwardly of the firing pin. The back end 11G of the cartridge, which corresponds to the mouth of Fig. 1, may be closed or it may be open for cooperation with gas bleed off passages. Where the back end 11G is open, the forward portion 37G of the ejector should overlap with at least a portion of the case. In other words, the ejector nose 37G should be of an outside diameter greater than the inside diameter of the cartridge, or the ejector nose may be eccentrically disposed as illustrated in Figs. 29 and 30. Fig. 31 illustrates a variant of Fig. 29 wherein the head section 5H and adjacent part of the body section of the cartridge are of a bottle neck design or relatively enlarged with respect to the remainder of the case.

Fig. 32 illustrates apparatus of a type suitable for the cartridge of Fig. 25, and is similar to that previously described. One of the advantages of this system is that the firing pin is spaced from both the breech face 25I and the ejector 38I. If both ends of the case are left open, the cartridge may be reversible; and while the anvil 5F is a separate element, the remainder of the case is extremely simple.

Referring now to Fig. 33, it may be desirable to eliminate the usual firing pin and substitute an electrical firing system. The space gained in removing a mechanical firing pin might be employed more usefully in the disposition of other parts of the tool, and a stronger breech construction is generally possible. In the Fig. 2 embodiment, for example, the interruption 48 in the breech block 23 is a weakness and gases might escape through the adjacent portion of the cartridge case, which is weakened and deformed by the firing pin 47.

In Fig. 33, the cartridge case is more firmly supported, the only interruptions occurring at points where the wall of the cartridge is relatively strong. The cartridge, itself, may be of the open back type so that an electrical connection may be made to the primer P. The cartridge case is formed with a cylindric body 3J and a rear flange 7J, which supports base wad WB. This wad may be a disc of insulating material, and the primer is a similar disc held against the inner face of the base wad. Although the primer is shown unsupported, suitable means may be provided for holding the primer in proper position. The breech block 23J and barrel portion 21J are as described heretofore, but the anvil or ejector 37J is somewhat different.

The base wad is adapted to be punctured by a needle 47J, which is a portion of an electric conductor 46J extending axially through the ejector and held in insulated relationship therewith by insulation 48J. The circuit is continued from the conductor 46J, as indicated diagrammatically, through an electric supply ES and switch SS to the wall of the cartridge case, so that a circuit is completed through the primer P. As the breech is closed, the needle is driven through the base wad WB into electrical contact with the primer. If corrosion difficulties are encountered, the needle may be eliminated by providing the cartridge with a contact button (not shown) extending from the primer through the base wad WB for electrical engagement with the conductor 46J. Other arrangements will also be apparent to those skilled in the art.

A number of embodiments have been discussed, hence it may be useful to review broadly some of the features of this invention. In all instances, the cartridge compares favorably in cost and simplicity with conventional rim-fire cartridges but offers advantages in strength and ease of extraction. The primer-containing portion of the case is not located at the breech face but is recessed within the bolt (in most instances) or within the barrel (when front ignition is desired). For this reason, the primer section of the case may be thin in order to facilitate crushing of the primer, whereas the integral body section may be thick in order to resist failure at the breech face and facilitate extraction. The method of extraction and ejection permits high-power loadings, and the transversely-movable firing pin does not displace the cartridge longitudinally within its firing chamber.

In certain embodiments, further advantages are derived in bleeding off propellent gases through the bolt and receiver, rather than through the barrel; and bleed-off may be facilitated by providing an opening in the back of the case. Although the invention contemplates that the primer may be centrally supported upon an anvil-forming portion of the ejector, the case may form its own anvil, or the item to be propelled may function as an anvil.

Other features of the invention will be apparent to those skilled in the art, and although more than several embodiments have been disclosed, the invention should not be considered so limited, as still other embodiments will readily occur to those skilled in the art, without departing from the spirit of the invention or the scope thereof, as set forth in the appended claims.

Having thus described the invention, what is claimed and desired to be secured by Letters Patent is:

1. In an explosive operated apparatus for driving a fastener with a power cartridge having a case including an anterior portion formed with an elongated body section containing a charge or propellant for generating driving pressure when ignited and at one end of said body section a mouth adapted for discharging said ignited propellant and including a posterior portion of the case opposite said mouth formed of the remaining length of said body section and a head section of imperforate structure integral therewith including a coaxial anvil enveloped by said remaining length in spaced relationship for containing adjacent said length of body section a ring of primer material sealed therein, said posterior portion being of an outer dimension along its length no greater than the outer dimension forwardly thereof, the combination comprising a barrel and a breech block mounted for relative axial movement with respect to each other, said block having a forwardly opening chamber for receiving said posterior portion of the case in telescoping obturating relationship, said barrel having a bore adapted for receiving said fastener and propellant discharge, said bore being formed for receiving said anterior portion of the case in telescoping obturating relationship when the breech is closed, cartridge firing means opposite said head section of the received case, means for axially moving said barrel and block together to enclose said cartridge as a condition precedent to igniting the primer and apart from each other sufficiently for loading said fastener into said bore and said cartridge into said chamber, and cartridge head section abutment means mounted adjacent the base of said chamber movably from a normally retracted position for ejecting the case from said chamber after said firing and said movement apart.

2. Apparatus as set forth in claim 1, wherein said cartridge-firing means is a firing pin mounted to move opposite said head and anvil sections of the cartridge for movement in a direction transverse to said barrel bore.

3. Apparatus as set forth in claim 1, wherein the chamber within said breech block is of a length greater than half the length of the cartridge and wherein the rest of the chamber is formed in the breech of the barrel, said breech being faced to close over and support the remaining length of the body section of the cartridge in abutment not only with the mouth of the cartridge but also with said block.

4. Apparatus as set forth in claim 1, wherein the base of said chamber within the breech block is formed with a gas bleed-off passage.

5. Apparatus as set forth in claim 1, wherein the ejecting means is mounted in the breech block and includes a telescoping ejector in the base movable axially from a retracted position clear of the chamber within the breech block to an advanced position extending into the chamber.

6. Apparatus as set forth in claim 1 adapted for a cartridge which is folded at the posterior end of the case to form a recess in the head section whereby said primer material is in said fold, wherein said ejecting means has an anvil-forming nose which extends axially within the recess to support not only the cartridge but also the primer when the ejecting means is in its retracted position.

7. Apparatus as set forth in claim 6, wherein the nose of said ejecting means is formed with a forwardly-opening gas bleed-off passage.

8. In breech-loaded cartridge-firing fastener driving apparatus having a barrel and a cooperating breech block having a forwardly-opening chamber which together with said barrel forms a chamber for said cartridge; the improvement that comprises a gas bleed-off passage extending through said breech block and opening at one end to the back of said chamber, and adjustable means communicating with the other end of said passage for varying the amount of gas bled through said passage.

9. Apparatus as set forth in claim 8, wherein said adjustable means comprises an elongate closed chamber, one wall of which is adjustable toward and away from an opposite wall to vary the volume of said chamber.

10. Breech-loaded cartridge-firing fastener driving apparatus comprising a barrel and cooperating breech block which are relatively movable in an axial direction, said breech block having a breech face defining the parting plane with the end of the barrel, said bleech block having a chamber-forming bore of substantial length extending back from the breech face thereof a distance less than the length of said cartridge, a second passage extending in generally radial direction through said breech block from said chamber-forming bore at a point rearwardly of said breech face, and a firing pin mounted within said radial passage for movement from retracted position clear of said chamber-forming bore to an advanced position partly within said bore.

11. Breech-loaded cartridge-firing fastener driving apparatus comprising a forwardly-extending barrel housing and a transevrsely projecting grip mounted at the back of said barrel housing, a breech block secured over said grip at the back of said barrel housing, a barrel mounted for axial movement within said barrel housing, said breech block having a breech face defining the parting plane with the end of the barrel, said housing having an elongate side loading and extraction slot in part uncovered by forward movement of the barrel, said breech block having a chamber-forming bore of substantial length extending back from the breech face thereof a distance less than the length of said cartridge, a second passage extending through the breech block from the base of said chamber-forming bore radially toward said grip, a firing pin mounted within said grip for movement radially of said breech block from a retracted position clear of the chamber-forming bore to an advanced position partly within the bore, and a trigger mounted forwardly of the grip and beneath the barrel to control movement of the firing pin.

12. Apparatus as set forth in claim 11, further including a safety interlock mounted between said housing and block adapted for movement between positions adjacent one of which said interlock clears the firing pin and the other of which said interlock interferes with movement of said firing pin to the advanced firing position, said interlock being spring biased forwardly to the interfering position locking the firing pin against movement, and means mounted on said interlock cooperable with the breech face of the barrel when said block and the grip are moved forwardly together with respect to said barrel to abut with and hold said interlock so that the firing pin in the moving block clears the interlock when the block closes with the breech of the barrel.

13. Apparatus as set forth in claim 11, wherein said barrel has a handle projecting through the slot in the barrel housing for manipulating the barrel within its housing, said handle having an axial lost-motion connection with the barrel to prevent full retraction of the barrel and full closure of the breech by means of the handle alone.

14. Apparatus as set forth in claim 13, further including spring means biasing the barrel forwardly.

15. Apparatus as set forth in claim 11, wherein said firing pin has a pawl projecting laterally with respect to said pin toward said trigger, said trigger being pivoted on the grip at lower front portion of the trigger so that the back portion thereof is rocked downwardly upon manipulation of the trigger, said back portion of the trigger being abutable with said pawl to retract the firing pin upon manipulation of the trigger, resilient means mounted within said grip for opposing retraction of the firing pin, and means mounted within said grip and adapted to contact the pawl for moving said pawl clear of the trigger after predetermined retraction of the firing pin.

16. Cartridge-firing apparatus as set forth in claim 11, further including a two-hand safety element cooperable with the firing pin, said firing pin being an elongate member having a catch at its end remote from the chamber, said safety element being mounted on said grip adjacent said remote end normally being biased for locking engagement with the catch on the firing pin element when the latter is retracted, and manually actuated means movably mounted on said grip for moving said safety element clear of said catch, said manually actuated means bein inaccessible to the hand used in pulling the trigger for firing the appartus.

17. Apparatus of claim 1 wherein the barrel is abuttable with the mouth of the cartridge and wherein means is included in th block for biasing the cartridge forwardly in the chamber so as to displace the cartridge and its primer out of operative relationship with the ignition means unless said block is moved forwardly and sufficiently to place the barrel into abutment with said cartridge and to close with said barrel on the cartridge, thereby pushing said chamber upon said cartridge to place the firing means relative to the primer into operative position.

References Cited in the file of this patent

UNITED STATES PATENTS

| 17,644 | Smith | June 23, 1857 |
| 43,851 | Howe | Aug. 16, 1865 |
| 1,397,418 | Hamilton | Nov. 15, 1921 |
| 2,263,941 | Albree | Nov. 25, 1941 |
| 2,378,735 | Shaffer | June 19, 1945 |
| 2,397,572 | Weaver | Apr. 2, 1946 |
| 2,699,006 | Maerk | Jan. 11, 1955 |

FOREIGN PATENTS

| 1,073,899 | France | Mar. 24, 1954 |
| 922,994 | Germany | Jan. 31, 1955 |
| 149,829 | Sweden | Apr. 26, 1955 |